A. RIEBE.
BALL BEARING FOR VERTICAL SHAFTS.
APPLICATION FILED JAN. 20, 1906.

899,563.

Patented Sept. 29, 1908.

WITNESSES:
Fred White
René Bruine

INVENTOR:
August Riebe,
By his Attorneys
Arthur E. Fraser

UNITED STATES PATENT OFFICE.

AUGUST RIEBE, OF BERLIN, GERMANY.

BALL-BEARING FOR VERTICAL SHAFTS.

No. 899,563.

Specification of Letters Patent.

Patented Sept. 29, 1908.

Application filed January 20, 1906. Serial No. 296,960.

*To all whom it may concern:*

Be it known that I, AUGUST RIEBE, engineer, a subject of the King of Prussia, residing at Huttenstrasse 34 and 35, Berlin, in the Kingdom of Prussia, Germany, have invented certain new and useful Improvements Relating to Improvements in or Connected with Ball-Bearings for Vertical Shafts, of which the following is a full, clear, and exact description.

With ball bearings for vertical shafts various speeds are imparted to the balls by displacement of the axis of rotation of both rings or ball races, which causes the balls to run against each other and considerably disturbs the working of the bearings by roughening and spoiling the balls. This disadvantage can be somewhat decreased when the ring or ball race which does not turn, instead of having a curved or arc like grooved course, is provided with a level or flat course; but even this arrangement does not give a very satisfactory result as immediately a certain small amount of the axial displacement of both rings or ball races in a horizontal direction is exceeded the bearing no longer works satisfactorily. Further, the substitution of a level or flat course or race for a grooved course is not always an advantageous alteration, as naturally the greatest loading of the ball bearing can be only effected when the bearing is double grooved, that is to say, when each ring is provided with a grooved course or race. Ball bearings so constructed, however, require under any circumstances, elastic cages which at the same time permit the radial adjustment of the balls.

This invention relates to an elastic cage constructed to overcome the difficulties above referred to said cage being for the ball bearings of vertical shafts.

Figure 1:
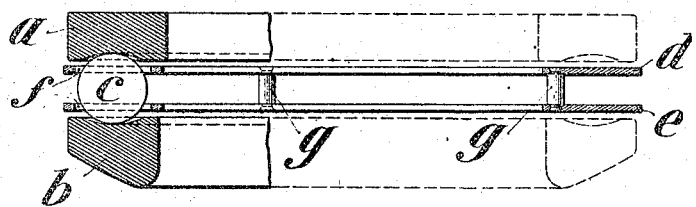
Figure 2:
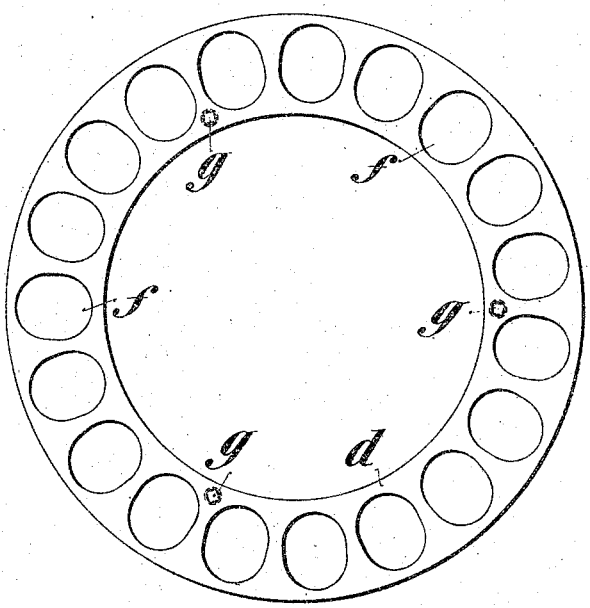

In the accompanying drawings: Figure 1 is a sectional view showing a cage constructed according to the present invention applied to a ball bearing for vertical shafts and Fig. 2 is a plan of the cage separately.

According to the present invention the cage consists of two metal disks or rings *d* and *e* arranged parallel or there about to the rings *a* and *b* of the bearing, which disks or rings are so arranged at a certain distance from each other that they hold the balls in the prescribed position by means of holes *f* which inclose the balls above and below their center. The rings are of thin sheet-metal lying in a single plane throughout their width (that is, without stiffening flanges, ribs, or the like) so as to be elastic and to yield readily.

In order to insure the separation of the disks or rings from each other, the disks or rings are so connected at several separated points by rivets *g* near the inner peripheries of the rings that this connection in no way, or but very slightly, interferes with the elasticity of the cage, but presents a minimum obstacle to the elastic yielding of the rings.

The holes of the disks or rings *d e* are elongated radially of the axis in both directions that is inward and outward, so that in the event of a horizontal displacement of the bearing rings or ball races when working or on account of incorrect setting up, an automatic adjustment of the balls is possible.

What I claim as my invention, and desire to secure by Patent is:

1. A ball bearing for vertical shafts, said bearing having a double-grooved course or ball path, in combination with a cage for separating the balls, said cage consisting of two perforated elastic rings each of thin sheet metal lying in a single plane throughout its width so as to yield readily, and connected together at a few separated points only, so as to present a minimum obstacle to the elastic yielding of the rings and to thereby permit a slight movement of the balls relatively to the cage, the perforations of said rings being elongated radially to permit a substantial radial displacement of the balls relatively to the cage, and said perforations having a width substantially equal to that of the balls at the point where the latter pass through the perforations.

2. A ball bearing for vertical shafts, having a double-grooved course or ball path, in combination with a cage for separating the balls, said cage comprising two perforated rings *d* and *e* each of thin sheet-metal lying in a single plane throughout its width so as to be elastic and to yield readily, and rivets *g* at a few separated points only, near the inner edges of the rings, so as to hold said rings in their proper relative position without substantial interference with the elasticity of the cage, whereby said rings are adapted to yield and thereby permit a slight movement of the balls relatively to the cage, the perforations $f$ of said rings being elongated radially to permit a substantial radial displacement of the balls relatively to the cage, and the width of said perforations being substantially equal to that of the balls at the point where the latter pass through the perforations.

In witness whereof, I have hereunto signed my name in the presence of two subscribing witnesses.

AUGUST RIEBE.

Witnesses:
 HENRY HASPER,
 R. W. KORN.